US009141414B2

(12) United States Patent
Haug et al.

(10) Patent No.: US 9,141,414 B2
(45) Date of Patent: Sep. 22, 2015

(54) PREFERRED COMPILATION

(75) Inventors: Gunter Haug, Walldorf (DE); Volker Hollich, Heidelberg (DE)

(73) Assignee: SAP SE, Walldorf (DE)

(*) Notice: Subject to any disclaimer, the term of this patent is extended or adjusted under 35 U.S.C. 154(b) by 299 days.

(21) Appl. No.: 12/974,563

(22) Filed: Dec. 21, 2010

(65) Prior Publication Data

US 2012/0159460 A1  Jun. 21, 2012

(51) Int. Cl.
*G06F 9/455* (2006.01)
*G06F 9/45* (2006.01)

(52) U.S. Cl.
CPC ............ *G06F 9/45516* (2013.01); *G06F 8/443* (2013.01); *G06F 8/48* (2013.01)

(58) Field of Classification Search
CPC ... G06F 8/4441; G06F 8/443; G06F 9/45516; G06F 2201/865; G06F 8/48; G06F 11/3612; G06F 11/3636; G06F 11/3644; G06F 11/3628
See application file for complete search history.

(56) References Cited

U.S. PATENT DOCUMENTS

| 5,995,754 | A   | * | 11/1999 | Holzle et al. | 717/158 |
|-----------|-----|---|---------|---------------|---------|
| 6,993,755 | B1  | * | 1/2006  | Ungar         | 717/158 |
| 7,100,154 | B2  | * | 8/2006  | Hicks         | 717/148 |
| 7,730,469 | B1  | * | 6/2010  | Boucher       | 717/151 |
| 7,770,157 | B2  | * | 8/2010  | Arnold et al. | 717/130 |
| 7,788,657 | B2  | * | 8/2010  | Wannamaker et al. | 717/158 |
| 8,156,481 | B1  | * | 4/2012  | Koh et al.    | 717/151 |
| 2002/0046400 | A1 | * | 4/2002 | Burch         | 717/154 |
| 2004/0044995 | A1 | * | 3/2004 | Hickson       | 717/148 |
| 2005/0071826 | A1 | * | 3/2005 | Nistler et al. | 717/145 |
| 2006/0206884 | A1 | * | 9/2006 | Creamer et al. | 717/147 |
| 2007/0033578 | A1 | * | 2/2007 | Arnold et al. | 717/130 |
| 2007/0180455 | A1 | * | 8/2007 | Mariani       | 719/328 |
| 2007/0294679 | A1 | * | 12/2007 | Bobrovsky et al. | 717/146 |
| 2009/0320008 | A1 | * | 12/2009 | Barsness et al. | 717/151 |

OTHER PUBLICATIONS

Arnold et al."Adaptive optimization in the Jalapeno JVM." ACM SIGPLAN Notices. vol. 35. No. 10. ACM, 2000. Retrieved on [Jul. 23, 2015] Retrieved from the Internet: URL<http://dl.acm.org/citation.cfm?id=353175>.*
Bruening et al."An infrastructure for adaptive dynamic optimization." Code Generation and Optimization, 2003. CGO 2003. International Symposium on. IEEE, 2003. Retrieved on [Jul. 23, 2015] Retrieved from the Internet: URL<http://ieeexplore.ieee.org/stamp/stamp.jsp?tp=&arnumber=1191551>.*

* cited by examiner

*Primary Examiner* — Thuy Dao
*Assistant Examiner* — Cheneca Smith
(74) *Attorney, Agent, or Firm* — Schwegman Lundberg & Woessner, P.A.

(57) ABSTRACT

A method and system to identify code entities suitable for preferred compilation is provided. An example method comprises detecting a request to start up a computer program comprising a plurality of code entities and commence interpreting code entities of the computer program. A numeric value associated with a code entity is compared with a threshold value. The code entity is designated for compilation at a next compilation tier based on a result of the comparing.

16 Claims, 5 Drawing Sheets

PREFERRED COMPILATION

TECHNICAL FIELD

This application relates to the technical fields of software and/or hardware technology and, in one example embodiment, to system and method to determine code entities suitable for preferred compilation.

BACKGROUND

In order to execute computer software written in a high level language, there are two generally accepted means. The source code may be first compiled by using a compiler into the object code (machine executable instructions), which can then be executed on a specific hardware (or simulated hardware) platform. Examples of computer languages that typically involve compilation are C or C++. Alternatively, the source code may be read by an interpreter, one line at a time, which directly causes the underlying hardware platform to carry out the instructions. LISP is one example of an interpreted computer language.

Some other computer program languages may be subject to a hybrid approach—interpreting some of the code entities and compiling some of the code entities. For example, Java™ Programs are commonly executed within a Java Virtual Machine (JVM). Java is a trademark of Sun Microsystems, Inc. in the United States, other countries, or both. A Java Virtual Machine executes the program code (bytecode) dynamically and typically incorporates both an interpreter and an optimizing Just-In-Time (JIT) compiler. A Java Virtual Machine may start processing the program code by interpreting the instructions but then compile some parts of the application code during runtime.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
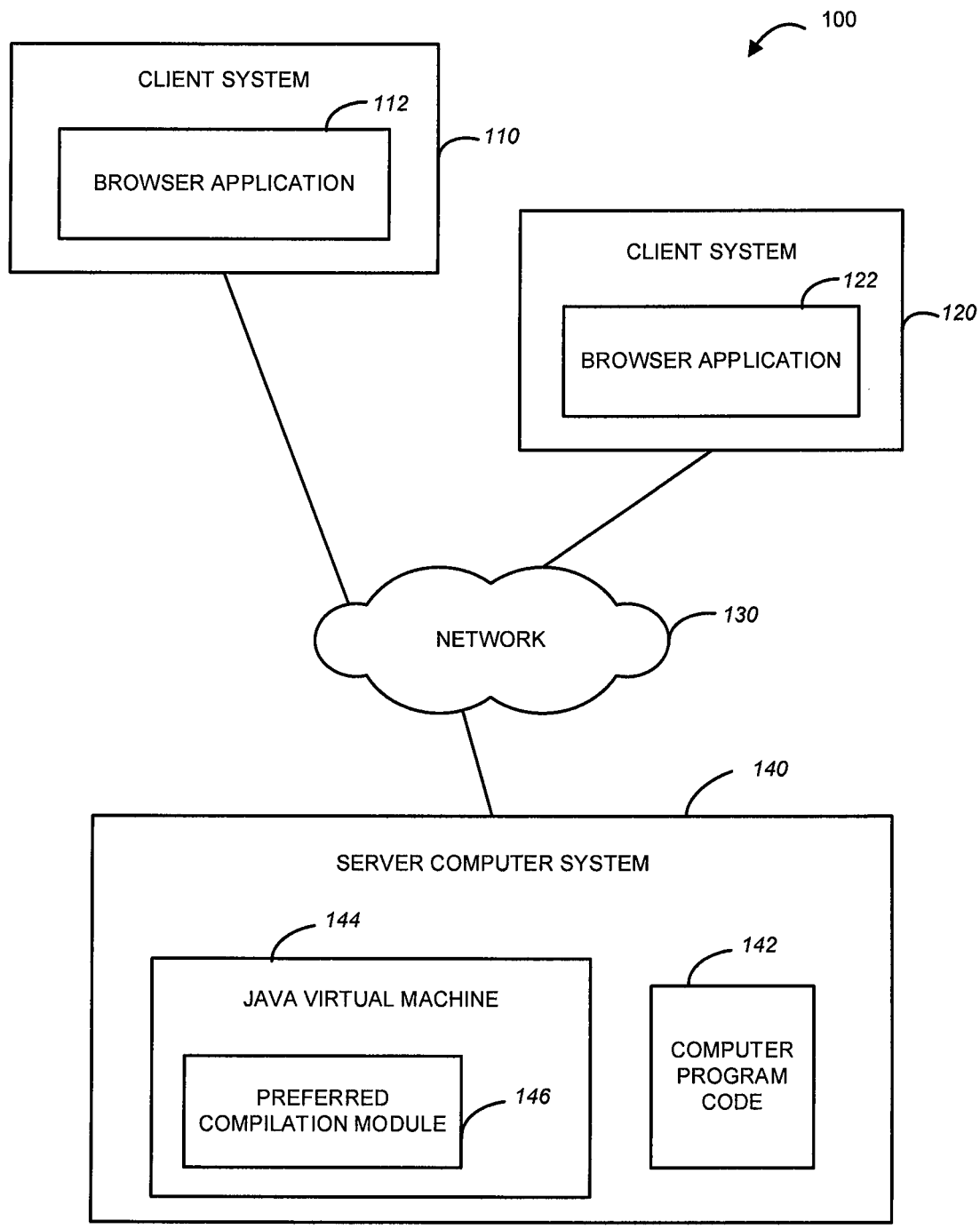
FIG. 1 is a diagrammatic representation of a network environment within which an example method and system to identify code entities suitable for preferred compilation may be implemented.

In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on administration of Java-based servers and related environments, the embodiments are given merely for clarity in disclosure. Thus, any type of server environment, including various system architectures, may employ various embodiments of the application-centric resources system and method described herein and is considered as being within a scope of the present invention.

As explained briefly above, computer program comprising a plurality of code entities (e.g., Java programs comprising a plurality of classes or methods) may be executed within a Java Virtual Machine (JVM) that typically incorporates, in addition to an interpreter, an optimizing Just-In-Time (JIT) compiler in order to speed-up program execution. A Java Virtual Machine thus can either evaluate each Java byte-code step by step as it runs the Java program (interpreter fashion) or compile a code entity (e.g., a class or a method) into machine code (by means of Just-In-Time compilation). A JIT compiler may apply various optimizations to the program code so that the compiled code executes faster than the interpreted code. While the interpreted code is slower-executing than a JIT-compiled version of the same code, no time is been spent on compiling and optimizing the interpreted code.

Because running an interpreter versus a JIT compiler for processing computer program code involves a tradeoff in performance, interpreting those methods that execute infrequently may be beneficial since the compilation overhead is higher than the gains obtainable from better optimized code. On the other hand, for methods that are invoked frequently in the course of the computer program execution, it may be beneficial to employ a JIT compiler, so that running these frequently-invoked compiled methods result in gain in performance in the long run.

A method and system is provided to identify code entities of a computer program that are suitable for so-called preferred compilation, which causes these identified code entities to be compiled earlier rather than later (if at all) during the process of starting up of the associated computer program. As mentioned above, a computer program may be a Java program comprising a plurality of Java methods that can be interpreted by an interpreter provided in a Java Virtual Machine or compiled using a JIT compiler provided in a Java Virtual Machine. The method and system may be utilized beneficially during the start-up of a computer program and may also be utilized to persist preferred compilation data for use during a subsequent start-up process of the same computer program.

A method and system to identify code entities suitable for preferred compilation may be utilized in conjunction with tiered compilation. Tiered compilation is a technique used mainly in virtual machines with just-in-time compilers, where one code entity (also referred to as a compilation entity) may be compiled using different levels of optimization. These levels of optimization are termed compiler tiers. The interpreted code may be considered as tier zero, whereas a low-effort compilation step results in code that is faster than the interpreted code may be considered tier one. A second-higher-effort compilation that results in even faster-executing code may be considered tier two. It is also possible to make use of more than two compiler tiers. One of the tasks addressed by a method and system to identify code entities suitable for preferred compilation is to determine how long a compilation entity is to be interpreted, when it should be taken to tier one and when it should be taken to the next compiler tier. Compiling too many compilation entities, compiling them too early, or compiling too few or too late may degrade start-up performance and/or overall performance of a computer program. Preferred compilation accomplishes the task of optimizing the start-up time of a computer program by taking the most suitable compilation entities to compiler tier one very early.

A Java Virtual Machine may be configured to include a preferred compilation module that is capable of identifying compilation entities that are suitable for just-in-time compilation. According to one example embodiment, a preferred compilation module associates a numeric value with each code entity from a subject computer program code. As the Java Virtual Machine encounters a particular code entity, the preferred compilation module compares the numeric value associated with that code entity to a predetermined threshold value. Based on the result of the comparison, the code entity is interpreted, or compiled using optimization level associated with a compiler tier one, or compiled using optimization level associated with a compiler tier two, etc. The numeric value of a code entity increases under certain criteria, e.g. each time the entity is executed. Once the numeric value associated with a code entity exceeds a predetermined threshold, the code entity is designated for a next (higher) tier compilation.

In one embodiment, the numeric value of a code entity is set to a default value (e.g., a zero) as the request to start the program execution is detected. The numeric value increases under certain criteria, e.g. each time the entity is executed, while it may also be decreased over time. More sophisticated criteria may be used to increase the numeric value associated with a compilation entity, such as, e.g., the number of loops performed within a code entity. A numeric value associated with a compilation entity may be decreased over time (e.g., divided by a factor) in order to reflect potential changes in the use pattern of the program. A preferred compilation module may also be configured to persist certain information regarding an entity that was compiled using the highest level of optimization in one run (e.g., in the course of a start-up) and use this preserved information to designate that entity for a very early tier-one compilation during a subsequent run of the computer program.

For example, according to one embodiment, each compilation entity reaching the highest compiler tier may be annotated. This information persists and is used in a consecutive run (e.g., in a consecutive start-up of the computer program). A tier-one threshold for annotated code entities may be selected to be lower value in comparison to a threshold value used in evaluating numerical values associated with un-annotated code entities. An example method and system to identify code entities suitable for preferred compilation may be implemented in the context of a network environment 100 illustrated in FIG. 1.

As shown in FIG. 1, the network environment 100 may include client systems 110 and 120 and a server system 140. The client systems 110 and 120 may run respective browser applications 112 and 122 and may have access to the server system 140 via a communications network 130. The communications network 130 may be a public network (e.g., the Internet, a wireless network, etc.) or a private network (e.g., a local area network (LAN), a wide area network (WAN), Intranet, etc.). The client systems 110 and 112 may utilize their respective browser applications 112 and 114 to access services provided by the server system 140. For example, the server 140 may host a web-based business application represented by computer program code 142.

The server system 140, in one example embodiment, may include a Java Virtual Machine 144 that can execute the computer program code 142. The Java Virtual Machine 144 can use its interpreter to evaluate instructions in the computer byte-code step by step and also use its JIT compiler to compile certain code entities of the computer program code 142. As shown in FIG. 1, the Java Virtual Machine 144 includes a preferred compilation module 146. The preferred compilation module 146 may be configured to identify those code entities from the computer program code 142 that are suitable for preferred compilation. Some modules provided in the Java Virtual Machine 144, including modules that are specific to the preferred compilation module 146 are illustrated in FIG. 2.

Figure 2:
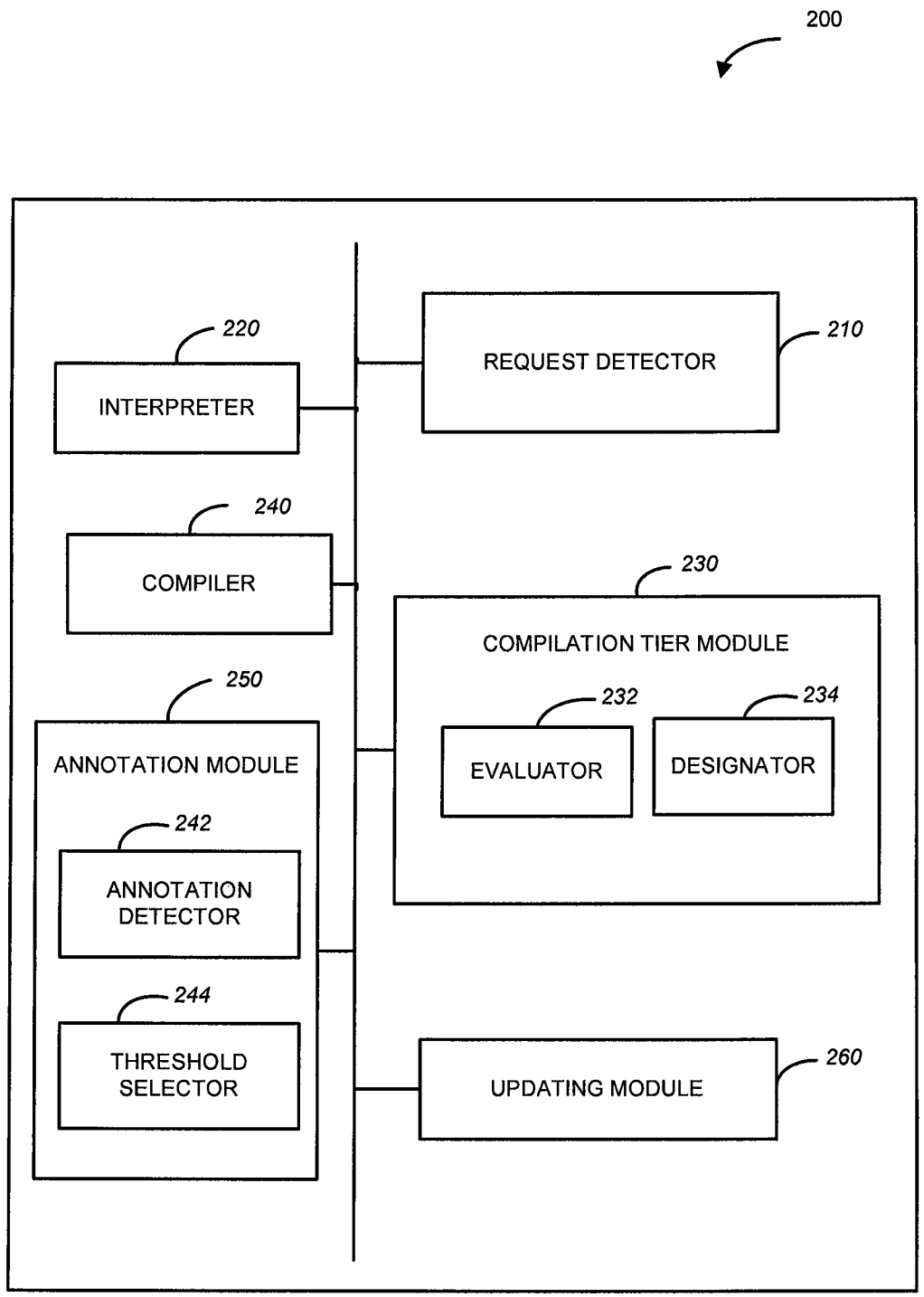
FIG. 2 is block diagram of a system to identify code entities suitable for preferred compilation, in accordance with one example embodiment.

FIG. 2 is a block diagram of a system 200 to identify code entities suitable for preferred compilation, in accordance with one example embodiment. As shown in FIG. 2, the system 200 includes a request detector 210, an interpreter 220, a compilation tier module 230, and a compiler 240. The request detector 210 may be configured to detect, at a computer system (e.g. the server computer system 140 of FIG. 1), a request to start up a computer program comprising a plurality of code entities. The computer program may be a business application and may be represented by the computer program code 142. The interpreter 220 may be configured to commence interpreting code entities of the computer program in response to the detecting of the request to start up the computer program. As explained above, some of the code entities in the computer program—e.g., those code entities that are frequently invoked during the start up process—may be designated for being compiled (rather than interpreted) in order to improve the overall performance the computer program. The compilation tier module 230 may be configured to determine which of the code entities are suitable for preferred compilation.

The compilation tier module 230, in one example embodiment, comprises an evaluator 232 and a designator 234. The evaluator 232 may be configured to compare a numeric value associated with a code entity with a threshold value, while the designator 234 may be configured to designate the code entity for compilation at a next compilation tier based on a result of the comparing (e.g., if the numeric value associated with the code entity is greater than or equal to the threshold value). If the numeric value associated with the code entity is less than the threshold value, the code entity is interpreted by the interpreter 220. As mentioned above, a code entity may be assigned a numeric value as the start up process is commenced. This numeric value may be increased each time a triggering event, such as, e.g., an invocation of the code entity, is encountered. Once the numeric value reaches a predetermined threshold value, it is inferred that the time it would take to compile the entity will be negated by the time savings of running the compiled entity during subsequent executions of the entity.

It will be noted that, while in some embodiments a numeric value assigned to a code entity may be increased every time a triggering event is detected, in other embodiments a numeric value assigned to a code entity may be decreased every time a triggering event is detected, and the initially-assigned numerical value may be set to some high value. Consequently, the designator 234 may be configured to designate the code entity for compilation at a next compilation tier if the numeric value associated with the code entity is less than or equal to the threshold value. The compiler 240 may be configured to compile the code entity using a level of optimization associated with the next compilation tier determined by the designator 234.

The system 200 may also include an annotation module 250. The annotation module 250 may be configured to annotate a code entity. An annotation associated with a code entity indicates that the code entity is suitable for preferred compilation. The annotation module 250 may include an annotation detector 242 and a threshold selector 244. The annotation detector 242 may be configured to examine a code entity and detect an annotation indicating that the code entity was compiled using a higher-level optimization during a previous invocation of the computer program. The threshold selector 244 may be configured to select a lower threshold value to be used by the evaluator 232, which may result in such annotated code entity being compiled earlier in the start up process. As mentioned above, in some embodiments a numeric value assigned to a code entity may be decreased every time a triggering event is detected, and designator 234 may be configured to designate the code entity for compilation at a next compilation tier if the numeric value associated with the code entity is less than or equal to the threshold value. In this embodiment, the threshold selector 244 may be configured to select a higher threshold value to be used by the evaluator 232, as compared to a default threshold value.

The annotation module 250 may be further configured to annotate a code entity that has reached certain (e.g., highest) compiler tier and store the resulting annotation for use during a subsequent start up process of the computer program. The system 200 also comprises an updating module 260 to update the numeric value associated with a code entity in response to a triggering event (e.g., each time a code entity is executed during the start up process). An example method to identify code entities suitable for preferred compilation can be described with reference to FIG. 3.

Figure 3:
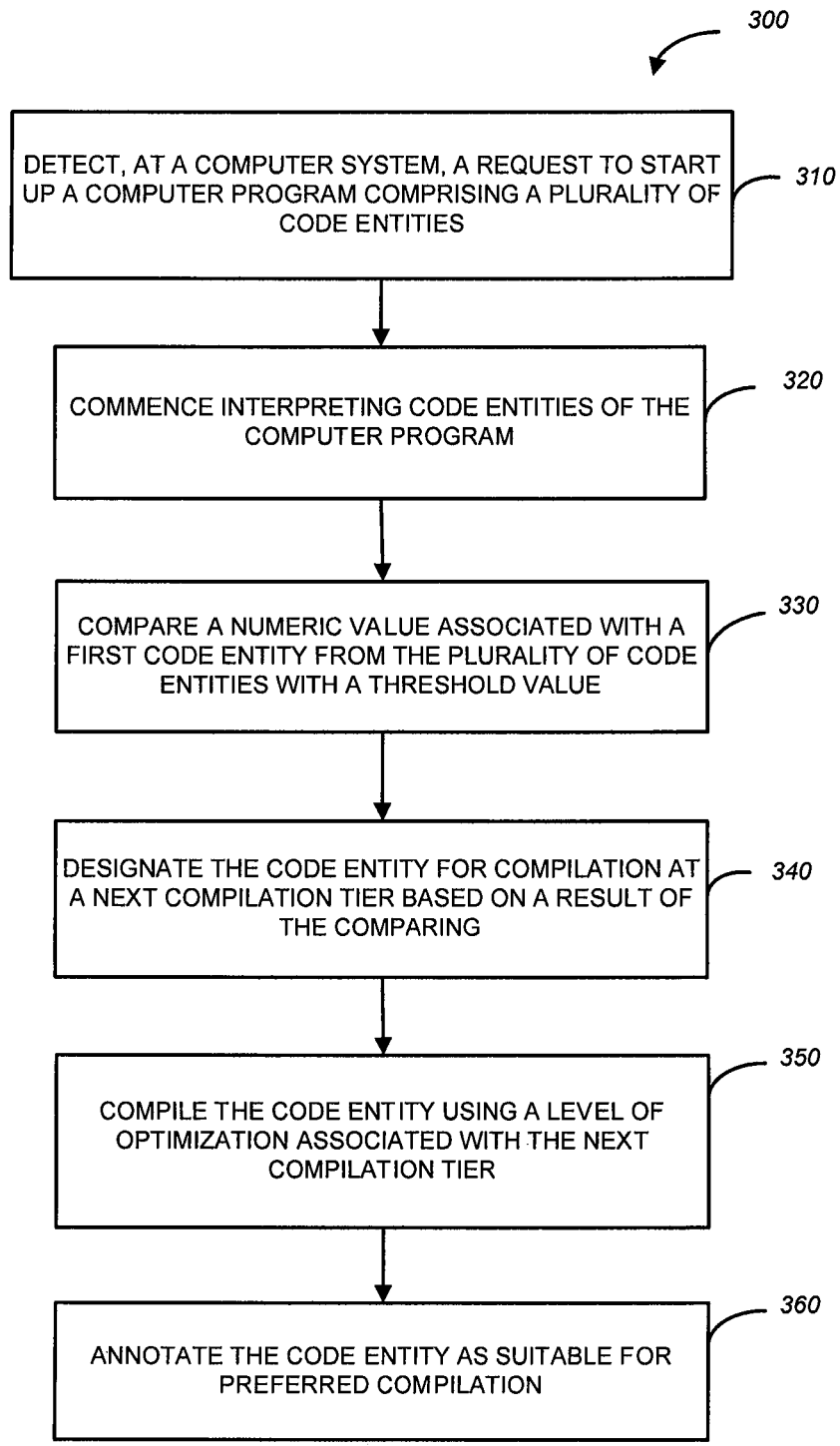
FIG. 3 is a flow chart of a method to identify code entities suitable for preferred compilation, in accordance with an example embodiment.

FIG. 3 is a flow chart of a method 300 to identify code entities suitable for preferred compilation, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides, at the server system 140 of FIG. 1 and, specifically, at the system 200 to identify code entities suitable for preferred compilation shown in FIG. 2.

As shown in FIG. 3, the method 300 commences at operation 310, when the request detector 210 of FIG. 2 detects, at the server computer system 140 of FIG. 1, a request to start up a computer program comprising a plurality of code entities. At operation 320, the interpreter 220 of FIG. 2 commences interpreting code entities of the computer program. At operation 330, the evaluator 232 of FIG. 2 compares a numeric value associated with a first code entity from the plurality of code entities with a threshold value. At operation 340, the designator 234 of FIG. 2 designates the code entity for compilation at a next compilation tier based on a result of the comparing. The compiler 240 compiles the code entity using a level of optimization associated with the next compilation tier at operation 350. At operation 360, the annotation module 250 annotates the code entity as suitable for preferred compilation if the next compilation tier is the highest tier.

Figure 4:
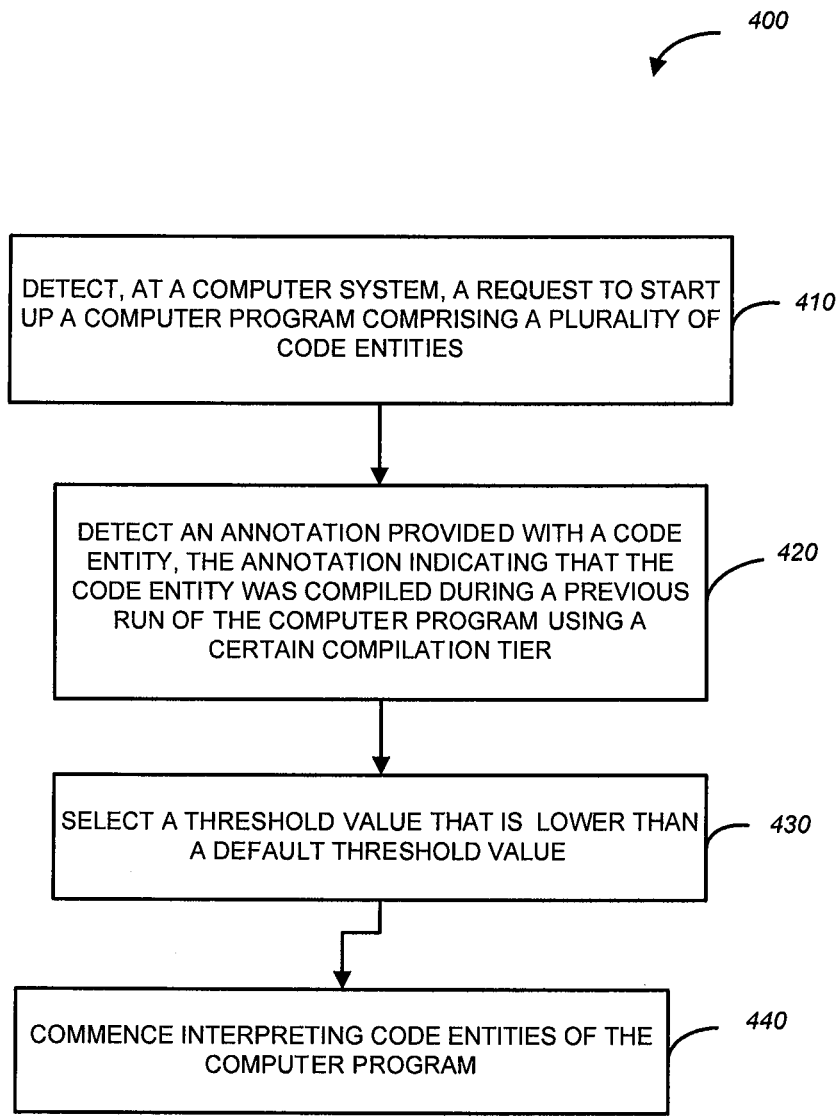
FIG. 4 is a flow chart of a method for utilizing persisting annotation of a code entity, in accordance with an example embodiment.

FIG. 4 is a flow chart of a method 400 for utilizing persisting annotation of a code entity, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 to identify code entities suitable for preferred compilation shown in FIG. 2.

As shown in FIG. 4, the method 400 commences at operation 410, when the request detector 210 of FIG. 2 detects, at the server computer system 140 of FIG. 1, a request to start up a computer program comprising a plurality of code entities. At operation 420, the annotation detector 242 of FIG. 2 detects an annotation provided with the code entity. The threshold selector 244 of FIG. 2 selects the threshold value from a plurality of threshold values in response to the detecting of the annotation at operation 430. At operation 440, the interpreter 220 of FIG. 2 commences interpreting code entities of the computer program.

Figure 5:
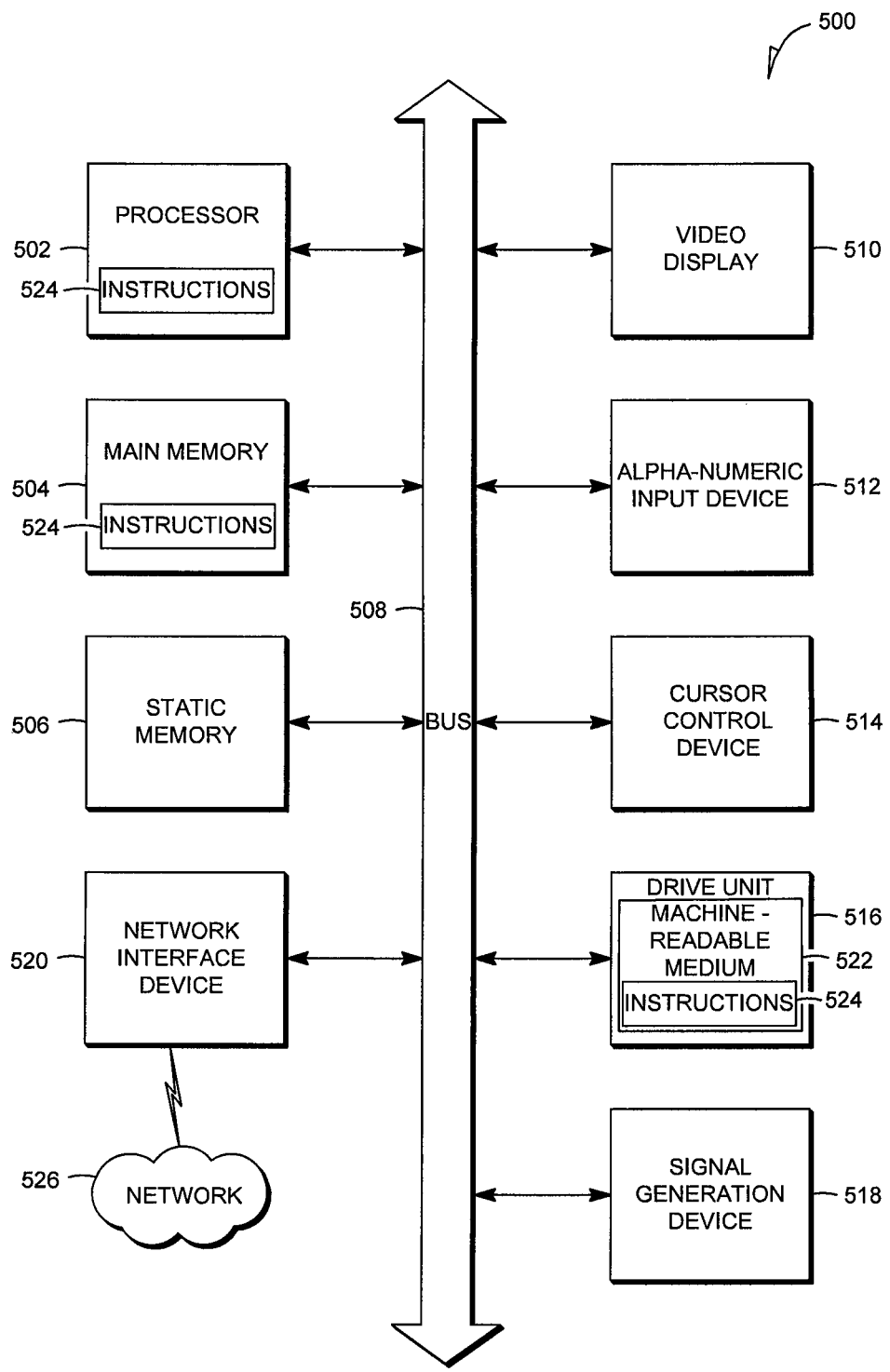
FIG. 5 is a diagrammatic representation of an example machine in the form of a computer system within which a set of instructions, for causing the machine to perform any one or more of the methodologies discussed herein, may be executed.

FIG. 5 shows a diagrammatic representation of a machine in the example form of a computer system 500 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 505. The computer system 500 may further include a video display unit 510 (e.g., a liquid crystal display (LCD) or a cathode ray tube (CRT)). The computer system 500 also includes an alpha-numeric input device 512 (e.g., a keyboard), a user interface (UI) navigation device 514 (e.g., a cursor control device), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, with the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system to identify code entities suitable for preferred compilation has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A computer-implemented method comprising:
    detecting, at a computer system, a request to start up a computer program comprising a plurality of code entities;
    commencing interpreting code entities of the computer program;
    comparing a numeric value associated with a first code entity from the plurality of code entities with a first threshold value, the first code entity lacking an annotation indicating that the code entity was compiled during a previous run of the computer program;
    based on a result of the comparing, designating the first code entity for compilation at a next compilation tier;
    compiling the first code entity using a level of optimization associated with the next compilation tier; and
    examining a second code entity from the plurality of code entities and detecting an annotation provided with the second code entity indicating that the second code entity was compiled during the previous run of the computer program;
    in response to the detecting of the annotation provided with the second code entity, selecting a second threshold value from a plurality of threshold values, wherein the second threshold value is the lowest or the highest value from the plurality of threshold values;
    based on a result of comparing a numeric value associated with the second code entity with the second threshold value, designating the second code entity for compilation at a next compilation tier.

2. The method of claim 1, wherein the numeric value is indicative of a number of invocations of the first code entity since the detecting of the request to start up the computer program.

3. The method of claim 1, wherein a next compilation tier is a low-effort tier-one compilation tier.

4. The method of claim 1, wherein a next compilation tier is a tier-two compilation tier, the tier-two compilation tier to perform greater optimization of code than a low-effort tier-one compilation tier.

5. The method of claim 4, comprising:
    in response to the designating of the first code entity for compilation at the next compilation tier, annotating the first code entity, wherein an annotation resulting from the annotating is to persist for use during a subsequent start up process of the computer program.

6. The method of claim 1, further comprising:
    comparing a numeric value associated with a third code entity from the plurality of code entities with the first threshold value;
    based on a result of the comparing, proceeding with interpreting instructions of the third code entity; and
    update the numeric value associated with the third code entity.

7. The method of claim 1, wherein based on a result of the comparing, the designating of the first code entity for compilation at the next compilation tier is based on determining that the numeric value associated with the first code entity is greater than the threshold value.

8. The method of claim 1, wherein the first code entity is a Java method.

9. A computer-implemented system comprising:
    a request detector to detect, at a computer system, using at least one processor, a request to start up a computer program comprising a plurality of code entities;
    an interpreter to commence interpreting code entities of the computer program, using at least one processor;
    an evaluator to, using at least one processor of the computer-implemented system:
        compare a numeric value associated with a first code entity from the plurality of code entities with a first threshold value, the first code entity lacking an annotation indicating that the code entity was compiled during a previous run of the computer program, and
        examine a second code entity from the plurality of code entities and detect an annotation provided with the second code entity indicating that the second code entity was compiled during the previous run of the computer program;
    a threshold selector to select a second threshold value from a plurality of threshold values in response to the detecting of the annotation provided with the second code entity, wherein the second threshold value is the lowest or the highest value from the plurality of threshold values;
    a designator to, using at least one processor:
        designate the first code entity for compilation at a next compilation tier based on a result of the comparing, using at least one processor, and
        based on a result of comparing a numeric value associated with the second code entity with the second threshold value, designating the second code entity for compilation at a next compilation tier; and
    a compiler to compile the first code entity using a level of optimization associated with the next compilation tier, using at least one processor.

10. The system of claim 9, wherein the numeric value is indicative of a number of invocations of the first code entity since the detecting of the request to start up the computer program.

11. The system of claim 9, wherein a next compilation tier is a low-effort tier-one compilation tier.

12. The system of claim 9, wherein a next compilation tier is a tier-two compilation tier, the tier-two compilation tier to perform greater optimization of code than a low-effort tier-one compilation tier.

13. The system of claim 12, wherein the annotation module to:
- annotate the first code entity with an annotation; and
- store the annotation for use during a subsequent start up process of the computer program.

14. The system of claim 9, wherein:
- the evaluator is to compare a numeric value associated with a third code entity from the plurality of code entities with the first threshold value;
- the interpreter is to proceed with interpreting instructions of the third code entity in response to the comparing, the system further comprising an updating module to update the numeric value associated with the third code entity.

15. The system of claim 9, wherein the designator is to designate the first code entity for compilation at the next compilation tier based on the numeric value associated with the first code entity being greater than the threshold value.

16. A machine-readable non-transitory medium having instruction data to cause a machine to perform operations comprising:
- detecting, at a computer system, a request to start up a computer program comprising a plurality of code entities;
- commencing interpreting code entities of the computer program;
- comparing a numeric value associated with a first code entity from the plurality of code entities with a first threshold value, the first code entity lacking an annotation indicating that the code entity was compiled during a previous run of the computer program;
- designating the first code entity for compilation at a next compilation tier based on a result of the comparing;
- compiling the first code entity using a level of optimization associated with the next compilation tier;
- examining a second code entity from the plurality of code entities and detecting an annotation provided with the second code entity indicating that the second code entity was compiled during the previous run of the computer program;
- in response to the detecting of the annotation provided with the second code entity, selecting a second threshold value from a plurality of threshold values, wherein the second threshold value is the lowest or the highest value from the plurality of threshold values;
- based on a result of comparing a numeric value associated with the second code entity with the second threshold value, designating the second code entity for compilation at a next compilation tier.

* * * * *